(12) United States Patent
Knie et al.

(10) Patent No.: US 10,914,344 B2
(45) Date of Patent: Feb. 9, 2021

(54) DEVICE AND METHOD FOR MOUNTING A BEARING ON A ROLL NECK AND FOR REMOVING THE BEARING FROM THE ROLL NECK

(71) Applicant: SMS Group GmbH, Duesseldorf (DE)

(72) Inventors: Daniel Knie, Freudenberg (DE); Andrej Tucak, Wenden-Bruen (DE)

(73) Assignee: SMS GROUP GMBH, Duesseldorf (DE)

( * ) Notice: Subject to any disclaimer, the term of this patent is extended or adjusted under 35 U.S.C. 154(b) by 252 days.

(21) Appl. No.: 16/083,033

(22) PCT Filed: Mar. 20, 2017

(86) PCT No.: PCT/EP2017/056502
§ 371 (c)(1),
(2) Date: Sep. 7, 2018

(87) PCT Pub. No.: WO2017/174335
PCT Pub. Date: Oct. 12, 2017

(65) Prior Publication Data
US 2019/0101161 A1   Apr. 4, 2019

(30) Foreign Application Priority Data

Apr. 8, 2016 (DE) .......... 10 2016 205 874
Jul. 29, 2016 (DE) .......... 10 2016 214 011

(51) Int. Cl.
*B21B 31/07* (2006.01)
*F16C 35/078* (2006.01)
(Continued)

(52) U.S. Cl.
CPC .......... *F16C 35/078* (2013.01); *B21B 31/07* (2013.01); *B21B 31/074* (2013.01); *B21B 31/08* (2013.01);
(Continued)

(58) Field of Classification Search
CPC ... B21B 2203/28; B21B 31/074; B21B 31/08; B21B 31/07
See application file for complete search history.

(56) References Cited

U.S. PATENT DOCUMENTS 3,627,388 A * 12/1971 Jennings ............... B21B 31/074
384/99
6,415,489 B1 * 7/2002 Martins ................. B21B 31/074
29/252
(Continued)

*Primary Examiner* — Adam J Eiseman
*Assistant Examiner* — Bobby Yeonjin Kim
(74) *Attorney, Agent, or Firm* — Abelman, Frayne & Schwab

(57) ABSTRACT

The invention relates to a device and a method for mounting a bearing 200 on a roll neck and for removing the bearing from the roll neck of a roll. Known devices of this type have a first and a second piston/cylinder unit. They also have a stop ring 130, fixed in the axial direction A at the end of the roll neck 320 remote from the body, which acts as a stop for the inner piston 110 of the first piston/cylinder unit. In addition, the known devices have a nut 150 which can be screwed onto an external thread of the inner piston to secure the bearing 200 in the axial direction, in particular during a rolling operation. As an alternative to the known prior art, the present invention provides that an annular cylinder 120 serves both as a cylinder for the first piston/cylinder unit and as a cylinder for the second piston/cylinder unit. For its function as a cylinder for the second piston/cylinder unit, said annular cylinder is covered to a certain ex ent on its side remote from the body by an annular cylinder cover 122. The cylinder cover 122 serves, together with an outer flange 142 of an outer piston 140, to axially delimit a removal pressure chamber 2 of the second piston/cylinder unit.

12 Claims, 10 Drawing Sheets

(51) Int. Cl.
*B21B 31/08* (2006.01)
*F16C 13/02* (2006.01)
*F16C 19/38* (2006.01)
*F16C 21/00* (2006.01)

(52) U.S. Cl.
CPC .............. *F16C 13/02* (2013.01); *F16C 19/38* (2013.01); *F16C 21/00* (2013.01); *F16C 2322/12* (2013.01)

(56) References Cited

U.S. PATENT DOCUMENTS

| | | | | |
|---|---|---|---|---|
| 7,380,431 | B2 * | 6/2008 | Shriner | B21B 31/074 |
| | | | | 72/245 |
| 7,386,939 | B2 * | 6/2008 | Di Giacomo | B21B 31/074 |
| | | | | 29/252 |
| 7,500,374 | B2 * | 3/2009 | Martins | B21B 31/074 |
| | | | | 72/245 |

* cited by examiner

DEVICE AND METHOD FOR MOUNTING A BEARING ON A ROLL NECK AND FOR REMOVING THE BEARING FROM THE ROLL NECK

RELATED APPLICATIONS

This application is a National stage application of International application PCT/EP2017/056502 filed Mar. 20, 2017 and claiming priority of two German applications DE 10 2016 205874.6 filed Apr. 8, 2016 and DE 10 2016 214011.6 filed Jul. 29, 2016, all of the three applications are incorporated herein by reference thereto.

The invention relates to a device and a method for mounting a bearing on a roll neck and for removing the bearing from the roll neck of a roll, for example a back-up roll. The bearing is used to mount the roll rotatably in a roll stand for rolling metal strip.

Devices and methods of this type are generally known in the prior art, e.g. from the German patent application DE 2144711. The device disclosed therein has a first piston/cylinder unit which has an annular cylinder and an annular inner piston. The inner piston is mounted, displaceable axially, on a section of the roll neck that is remote from the body. The cylinder is likewise mounted, displaceable axially, on the section that is remote from the body, between the bearing and the inner piston. The annular cylinder and the inner piston overlap one another partially and are positioned such that they can be displaced relative to one another in the axial direction. Between the annular cylinder and the inner piston of the first piston/cylinder unit a mounting pressure chamber is formed. At the end of the roll neck that is remote from the body, a stop ring is fixed as a stop for the inner piston of the first piston/cylinder unit. The inner piston of the first piston/cylinder unit is equipped with an external thread, onto which a nut can be screwed to secure the bearing in the axial direction.

The known device additionally has a second piston/cylinder unit with an annular outer piston, which is positioned coaxially to and radially further outward than the inner piston of the first piston/cylinder unit. The annular outer piston of the second piston/cylinder unit is also mounted such that it is displaceable axially. The outer piston has an outer flange, which delimits a removal pressure chamber of the second piston/cylinder unit at one end in the axial direction.

In this respect, the said German patent application DE 2144711 constitutes the closest prior art; device claim 1 is distinguished from this publication.

The object of the invention is to provide an alternative device to the prior art and an alternative method to the prior art for mounting a bearing on a roll neck of a roll, in particular a back-up roll, and for removing the bearing from the neck.

This object is achieved in terms of the device by the subject matter of claim 1. Said device is characterized, in contrast to the known device described in the introductory portion, in that the annular cylinder and an annular cylinder cover attached to the end of the cylinder that is remote from the body together form the cylinder unit of the second piston/cylinder unit, in which the outer piston is positioned so as to be axially displaceable, and in that the removal pressure chamber is delimited in the axial direction by the outer flange of the outer piston and by the cylinder cover.

In the present description, the terms "axial" and "radial" always refer to the longitudinal axis of the roll (=the center axis of the annular device of the invention).

In the context of the invention, the annular cylinder advantageously functions both as a cylinder for the first piston/cylinder unit and as a cylinder for the second piston/cylinder unit. Accordingly, the inner piston and the outer piston are both positioned such that they are axially displaceable in the annular cylinder. Because the outer piston is guided within the cylinder, no prior art openings and locking pins are required to transmit the axial forces generated during rolling operation. The axial force generated during rolling operation is thus transmitted via the largest possible end faces from the annular cylinder via the nut, the inner piston and the stop ring into the roll, which results in maximum stability and minimum wear. More particularly, force can be transmitted directly from the cylinder to the nut to the inner cylinder without the interposition of bolts, for example.

In the claimed invention, the claimed nut has a dual function: on the one hand, it serves to fix the positioning of the device, and on the other, the end face of the nut forms a stop surface for the outer piston during removal of the bearing from the roll neck.

According to a first embodiment example, the second piston/cylinder unit is configured as a double-acting cylinder unit. The provision of a positioning pressure chamber 3 that can be formed, delimited in the axial direction by the outer piston and the annular cylinder, advantageously enables a simple retraction of the outer piston in the axial direction away from the roll body without the need for space-consuming springs, as in the prior art. Specifically, the positioning pressure chamber offers the advantage that the outer piston can be retracted even at very low pressures, and that it requires relatively little space.

The aforementioned object is further achieved by a method for mounting the bearing on the roll neck according to claim 10 and by a method for removing the bearing from the roll neck according to claim 11, in both cases with the aid of the device according to the invention. Because the nut serves as a stop for the outer piston, during the removal process the force is transmitted to the inner piston and thus to the roll. The nut is operated such that it can be rotated easily by hand, in which only the friction of the thread has to be overcome and not the friction of seals of the outer piston, for example.

Further advantageous embodiments of the device of the invention and of the two methods of the invention are the subject matter of the dependent claims.

A total of 14 figures are attached to the description, in which

In the following, the invention will be described in detail with reference to the listed figures in the form of embodiment examples. In all of the figures, the same technical elements are denoted by the same reference signs.

Figure 1:
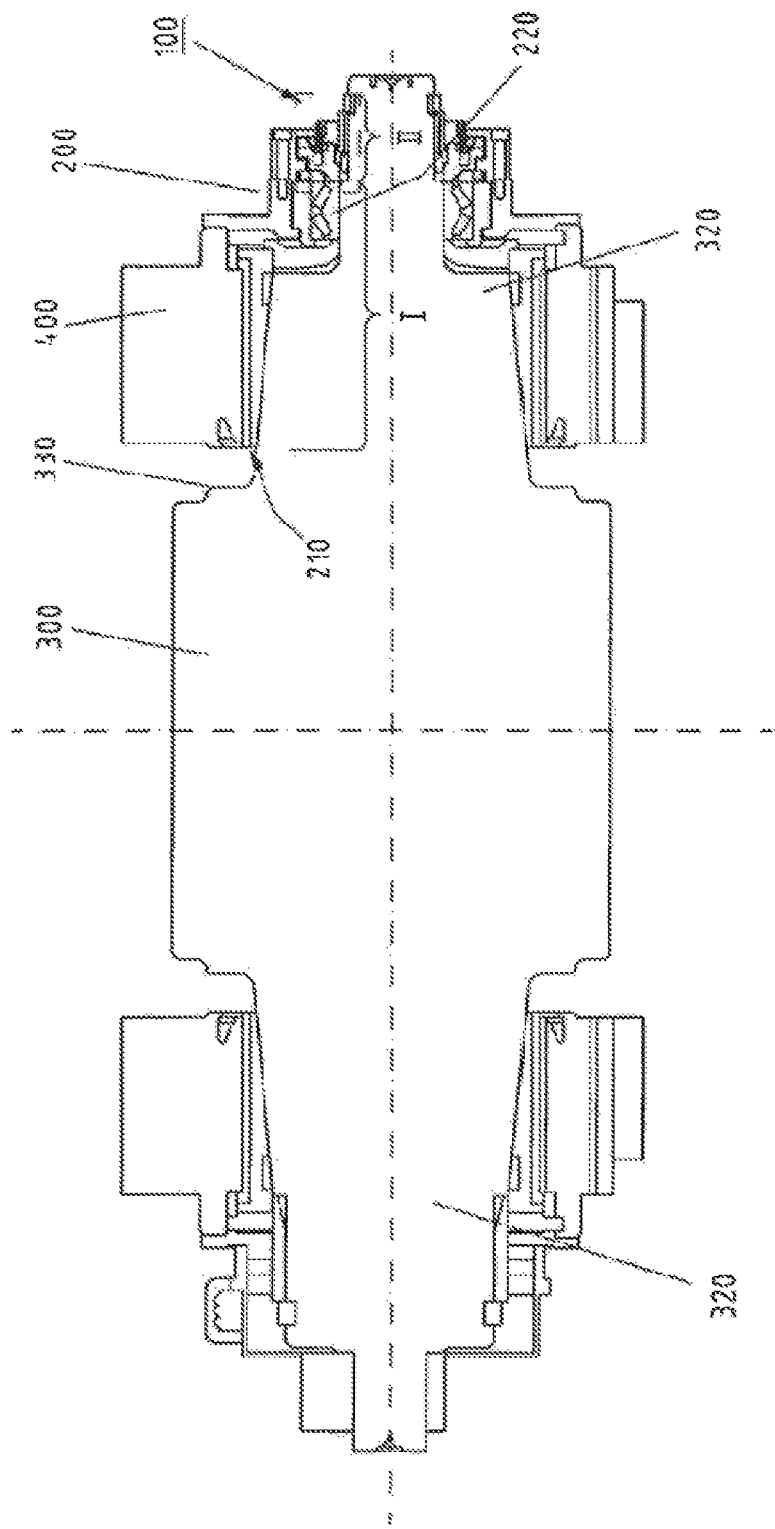
FIG. 1 shows a roll with bearings mounted on the necks of the roll and with the device of the invention.

FIG. 1 shows a classic roll 300, the roll necks of which are mounted via bearing housings 400, also called chocks, in a roll stand e.g. for rolling metal strip. The roll is mounted in the roll stand via both an oil film bearing 210 and a thrust bearing. The oil film bearing is not a subject of the invention and therefore is not detailed in FIG. 1. It is formed between the chocks 400 and the sleeves that are mounted on the roll necks. It serves in particular to absorb forces in the radial direction R such as those that occur during rolling operation.

On a stepped-down portion of the roll neck located farther than the oil film bearing from the body 330 of roll 300, a thrust bearing 220 is also provided, indicated in FIG. 1 by the obliquely positioned rollers. The thrust bearing serves to absorb axial forces on roll 300, such as those that may likewise occur during rolling operation. For conceptual distinction, the axial region in which the two bearings 200, i.e. the oil film bearing 210 and the thrust bearing 220, are located will be referred to as section I of the roll neck close to the body. Adjacent to this section, spaced even farther from roll body 330, is a section II, remote from the body, in which the device 100 of the invention for mounting bearing 200 on section I close to the body and for removing the bearing from section I close to the body is located. In the context of the invention, the term bearing 200 refers to oil film bearing 210 and/or thrust bearing 220, for example.

Figure 2:
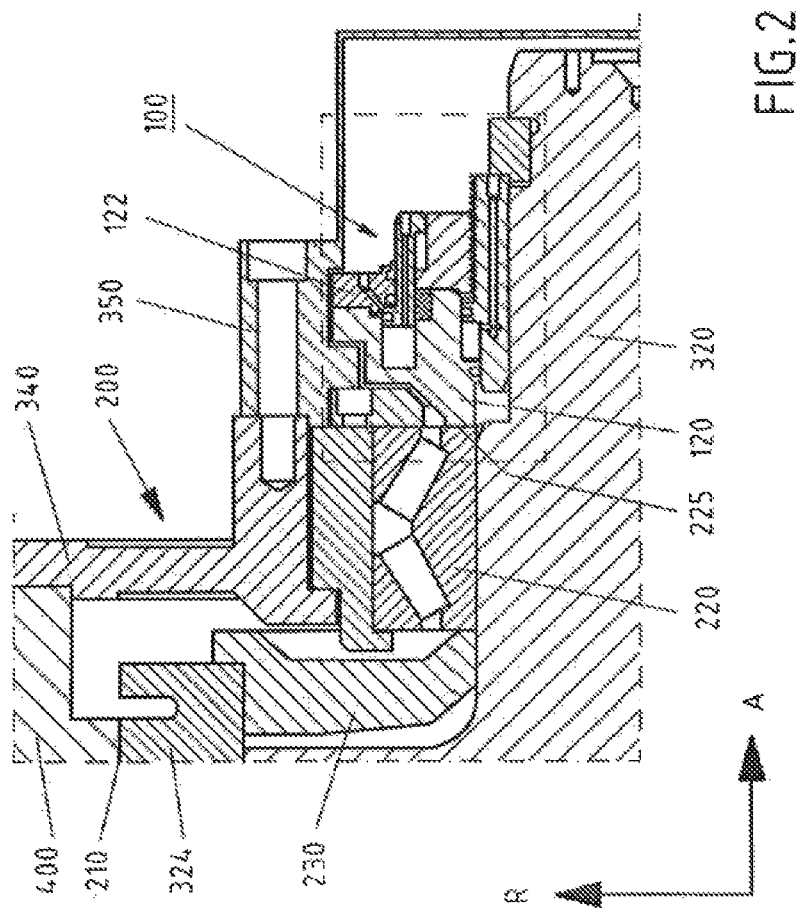
FIG. 2 shows a detail view from FIG. 1 with the device of the invention located at the end of the roll neck remote from the body.

FIG. 2 shows a detail view from FIG. 1. Here, thrust bearing 220 is clearly visible, which is connected non-positively in the axial direction via a pressure shoulder ring 230 to oil film bearing 210, in particular to neck sleeve 324 as part of the oil film bearing.

The device 100 according to the invention generates axial forces, including a mounting force in the direction of the roll body, i.e. toward the left in FIG. 2, for the purpose of mounting bearing 200 on roll neck 320. This axial mounting force acts on the end face 225 of thrust bearing 220 facing away from the body and is then also transmitted by said thrust bearing 220 via pressure shoulder ring 230 to oil film bearing 210, in particular to neck sleeve 324.

The device 100 of the invention also generates a removal force away from roll body 330, i.e. toward the right in FIG. 2. This force is transmitted to chock 400 via an annular cylinder 120 and cylinder cover 122, which are parts of the device 100 according to the invention. The force is transmitted via an annular cover 350, which is preferably screwed to the annular coupling element 340 and engages in non-positive contact with chock 400 to transmit the removal force to neck sleeve 324 and to bearing 200.

Figure 3:
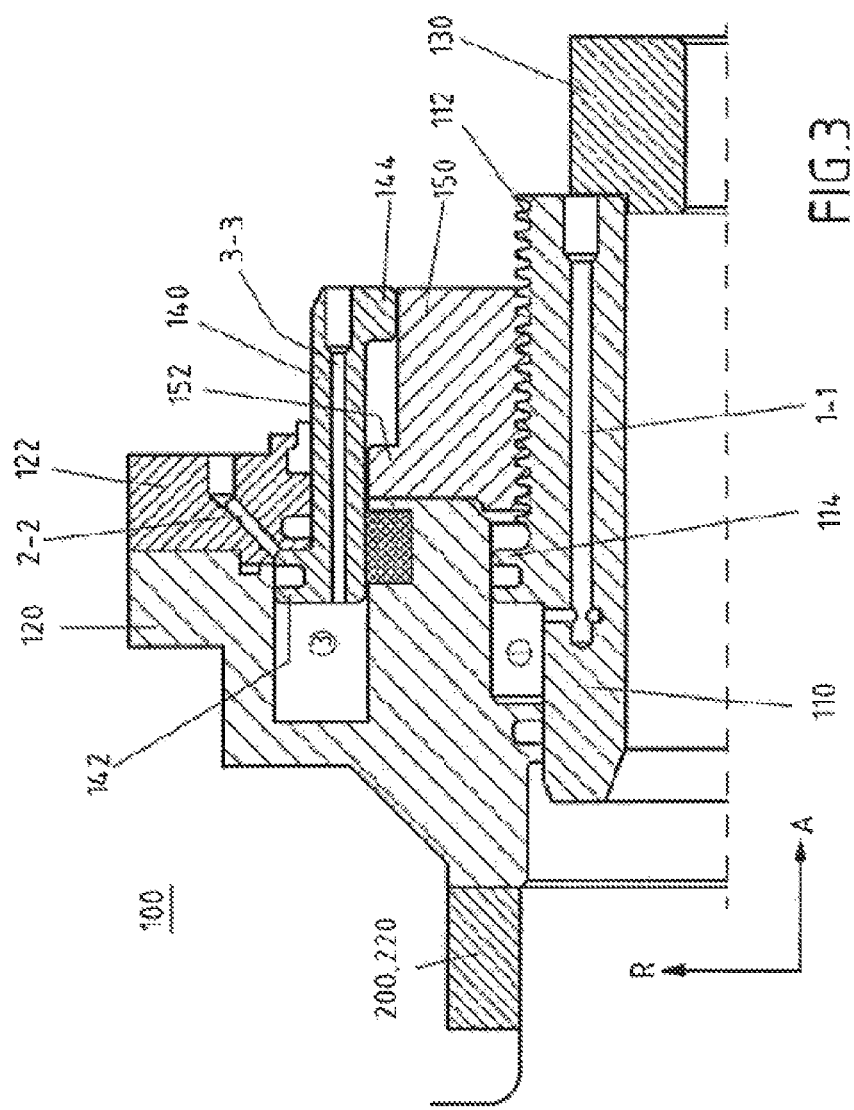
FIG. 3 shows the structure of the device according to the invention.

FIG. 3 shows the basic structure of the device 100 according to the invention. The central element is the aforementioned annular cylinder 120. It serves both as a cylinder for a first piston/cylinder unit and as a cylinder for a second piston/cylinder unit. The first piston/cylinder unit is formed by the annular cylinder 120 and the annular inner piston 110, which is positioned in said cylinder such that it is displaceable axially. The annular cylinder 120 and the inner piston 110 are both mounted on section II of roll neck 320, remote from the body, such that they are displaceable axially, including relative to one another. Annular cylinder 120 is positioned between bearing 200, in particular thrust bearing 220, and inner piston 110, in particular the outer flange 114 thereof, for the purpose of transmitting said axial forces, in particular to thrust bearing 220. The pressure chamber of the first piston/cylinder unit is referred to in the present description as the mounting pressure chamber; it is formed between the annular cylinder and the inner piston and is denoted by reference numeral 1. The designation as the mounting pressure chamber indicates the significance of said pressure chamber to the mounting of bearing 200 on roll neck 320. Mounting pressure chamber 1 is pressurized with a pressure medium via a channel 1-1 formed, for example, as a bore within inner piston 110.

In addition to the first piston/cylinder unit, the annular cylinder 120 also serves to form a second piston/cylinder unit in that an outer piston 140 is also positioned, displaceable axially, in the annular cylinder 120. The term "outer" piston 140 indicates that the outer piston is disposed coaxially to and radially further outward than the inner piston 110 and is positioned such that it is displaceable axially. The outer piston 140 has an outer flange 142 which extends outward in the radial direction R from the lengthwise extension of the outer piston. In the axial direction A, the outer flange 142 delimits a removal pressure chamber 2; see FIG. 10, for example. Removal pressure chamber 2 is supplied with a pressure medium via a channel 2-2, which is formed, for example, within the outer piston 140. Removal pressure chamber 2 is part of the double-acting second piston/cylinder unit; this removal pressure chamber 2, apart from outer flange 142, is also delimited in the axial direction by a cylinder cover 122, which is preferably screwed onto annular cylinder 120.

Also clearly visible in FIG. 3 is a nut 150, which can be screwed onto an external thread 112 of the inner piston 110. Said nut is used to fix bearing 200 in the axial direction during the rolling operation once the bearing has been mounted on the roll neck. During fixing of the bearing, nut 150 is supported in the axial direction A via the external thread on the inner piston 110, while the inner piston is supported relative to the roll neck against a stop ring 130. Stop ring 130 is received in the axial direction in a groove 322, preferably an annular groove, formed at the end of roll neck 320 that faces away from the body. Stop ring 130 may be configured as a clamp ring or as a hinged ring, for example, for insertion into the groove.

The configuration of the second piston/cylinder unit as a double-acting piston/cylinder unit is apparent from the fact that, in addition to the removal pressure chamber 2, it includes a further pressure chamber, known as a positioning pressure chamber 3, which is delimited in the axial direction by the end face of the outer piston 140 at one end and by annular cylinder 120 at the other. Positioning pressure chamber 3 is supplied with pressure medium via a channel 3-3 in outer piston 140, for example. This positioning pressure chamber 3 serves to displace the outer piston away from the roll body, as will be explained later with the description of the method of the invention for removing the bearing from the roll body. In contrast, said removal pressure chamber 2 serves to displace outer piston 140 toward the roll body 330.

As viewed in the axial direction A, removal pressure chamber 2 is located farther away from the body than positioning chamber 3.

In addition to the aforementioned outer flange 142, the outer piston also has an inner flange 144 at its end facing away from the body, said inner flange extending radially inward, i.e. toward the inside of the annular outer piston 140. In addition, at the end of nut 150 that faces the body, an outer flange 152 is formed, extending radially outward. The nut 150 and the outer piston overlap one another at least partially. Outer piston 140 is positioned further outward radially than nut 150, but with the inner flange 144 of the outer piston and the outer flange 152 of the nut facing one another in the axial direction A. The outer flange 152 of the nut is located closer to the body than the inner flange 144 of the outer piston. Cylinder cover 122 may be configured as a separate component and may be connectable to cylinder 120, for example by screwing; alternatively, however, cylinder 120 and its cover 122 may be formed as one integral part.

Figure 4:
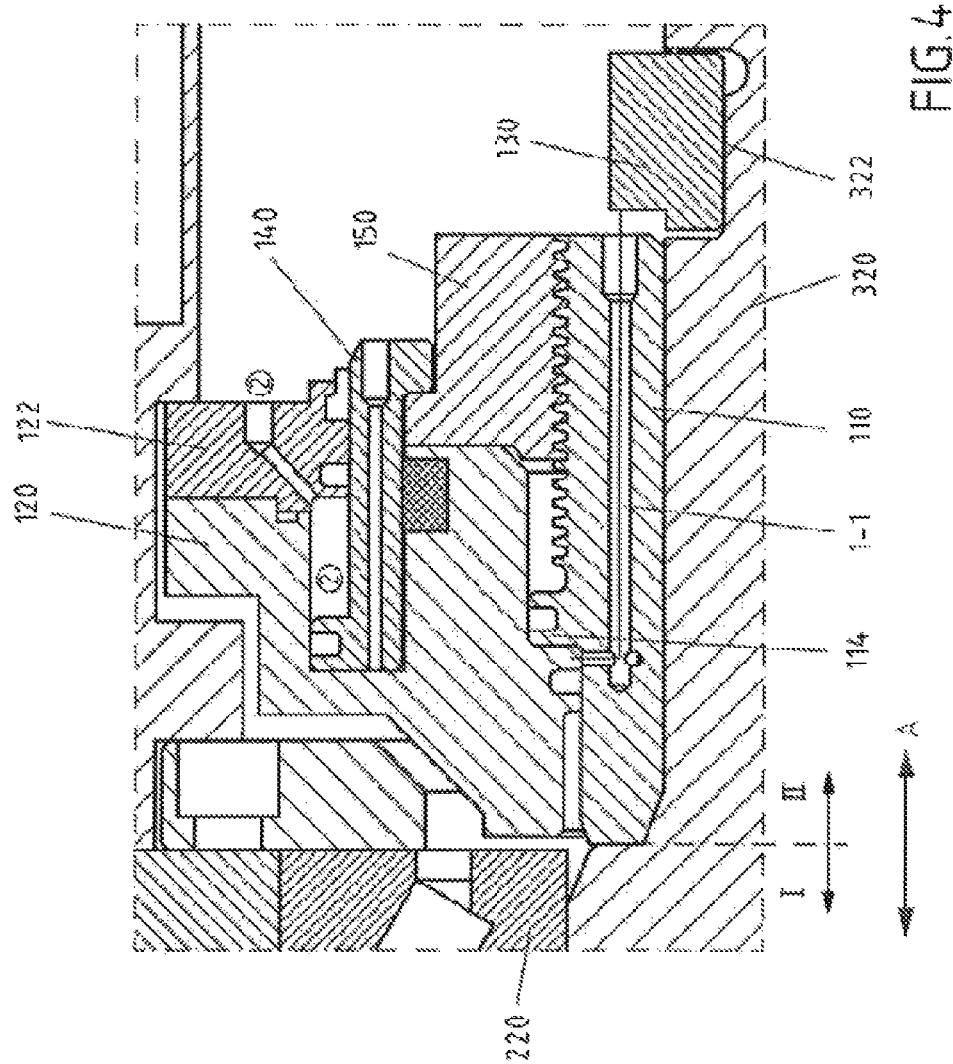
FIGS. 4-9 show sub-steps of the method according to the invention for mounting the bearing on the roll neck.
Figure 5:
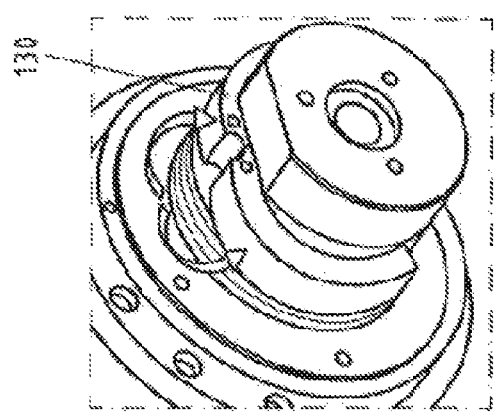

The method according to the invention for mounting bearing 200 on the section I of the roll neck close to the body using the device 100 according to the invention described above will be described in detail in the following, in which reference will be made to FIGS. 4 to 9: First, bearing 200, preferably the oil film bearing and the thrust bearing, is pushed "loosely" onto section I of the roll neck 320 close to the body, i.e. is prepositioned. Device 100 is likewise prepositioned on section II of roll neck 320 remote from the body, as shown in FIG. 4. Stop ring 130 is then fixed in annular groove 322. If stop ring 130 is configured as a hinged ring, its two halves are pivoted into annular groove 322, as illustrated in FIG. 5. When pivoted into the annular groove, stop ring 130 then forms a stop that is fixed in the axial direction A for the inner piston 110.

Figure 6:
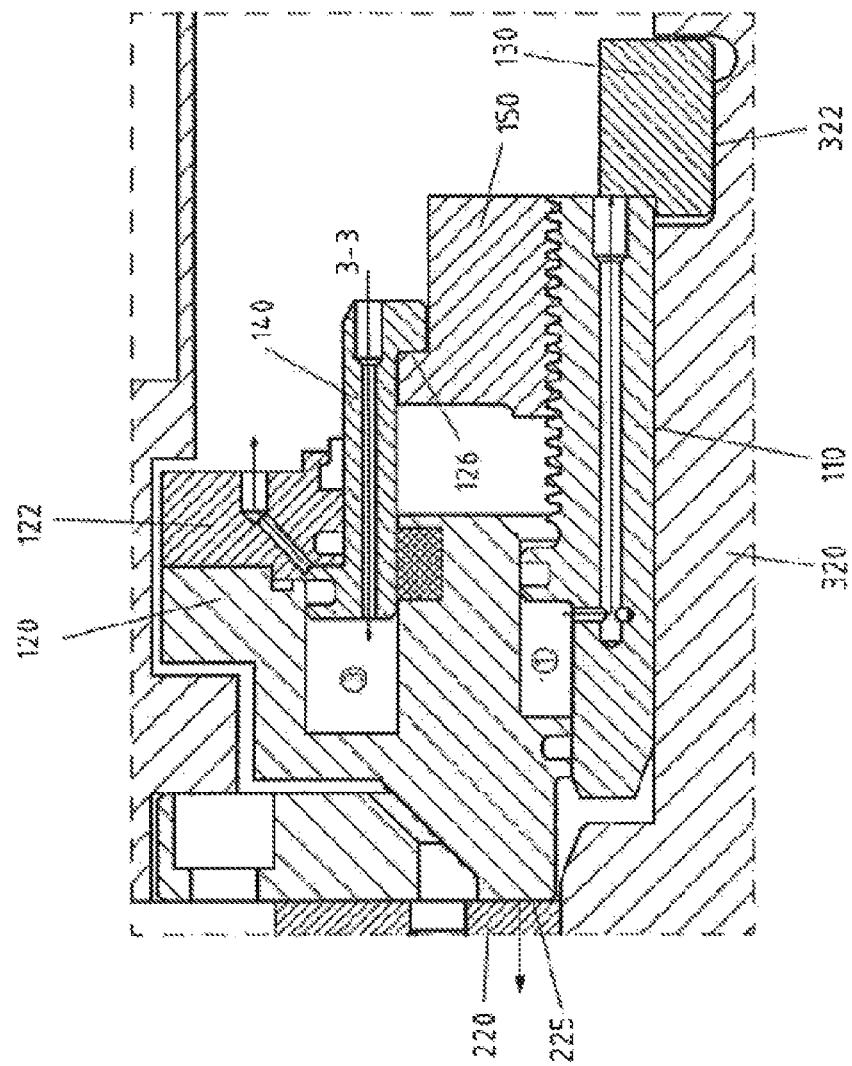

At the start of the mounting process, first a pressure medium is conducted through channel 1-1 inside the inner piston 110, thereby forming the mounting pressure chamber 1 between annular cylinder 120 and the outer flange 114 of the inner piston, as illustrated in FIG. 6. This mounting pressure chamber 1 is then pressurized by the pressure medium to a mounting pressure, thereby displacing inner piston 110 axially outward against stop ring 130. At the same time, cylinder 120 is moved inward in the axial direction A against bearing 200, thereby pulling/pushing the bearing further onto section I of roll neck 320 close to the body. FIG. 6 shows the formed mounting pressure chamber 1, the inner piston 110 moved outward, and the cylinder 120 moved inward, i.e. in the direction of the roll body, i.e. toward the left in FIG. 6. It is clear, in particular, that the bearing 220 is touching the annular cylinder 120 at contact surface 225, and is being acted on by the mounting pressure, as a result of which, as is also clear from FIG. 6, the thrust bearing 220 has been moved further toward the left in the direction of the roll body, as compared with its position in FIG. 4.

Via the pressure shoulder ring 230 shown in FIG. 2, the mounting force is also transmitted from thrust bearing 220 to the oil film bearing, more particularly to the neck sleeve 324 which aids in forming the oil film bearing, and as a result, the oil film bearing and in particular the neck sleeve are likewise pulled further in the direction of roll body 330.

Figure 7:
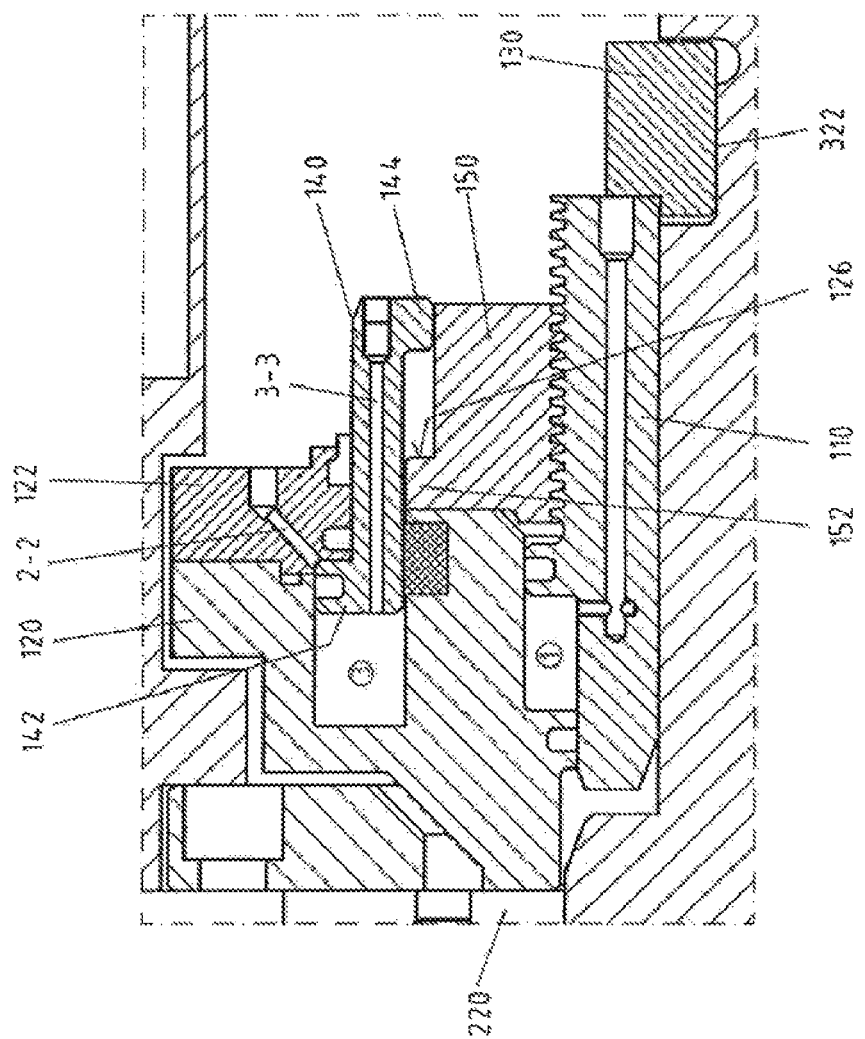

To avoid the need for a continuous application of mounting pressure by the pressure medium alone, especially during rolling operation, the positioning pressure chamber 3 is then likewise pressurized with a pressure medium via channel 3-3, whereby the outer piston 140 is displaced axially outward away from the roll body, although only minimally. Annular cylinder 120 continues to remain pressed against roller bearing 220 by the mounting pressure in mounting pressure chamber 1. This displacement of the outer piston 140 eliminates a first contact surface 126 between the inner flange 144 of the outer piston and the outer flange 152 of the nut 150. As a result, the nut is released from its non-positive blocking against contact surface 126, which has existed up to that point. The nut is then free and is rotated relative to the cylinder 120 on the external thread of the inner piston 110 in the direction of roll body 330 in order to fix the cylinder in its non-positive stop position relative to the bearing 220. The resulting position is shown in FIG. 7.

Figure 9:
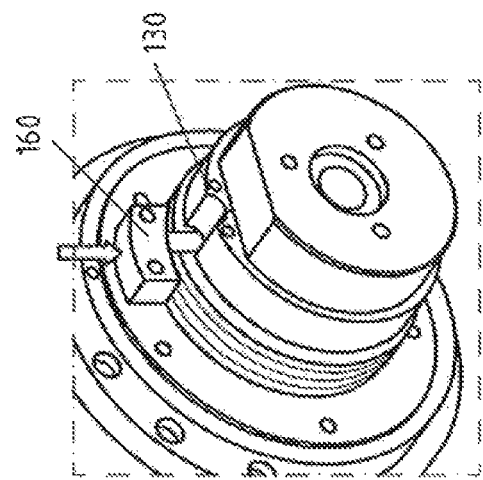

Rotation and axial displacement of the nut 150 are prevented by a locking piece 160, which is attached at the end face of nut 150 that faces away from the body, as shown in FIG. 9.

Figure 8:
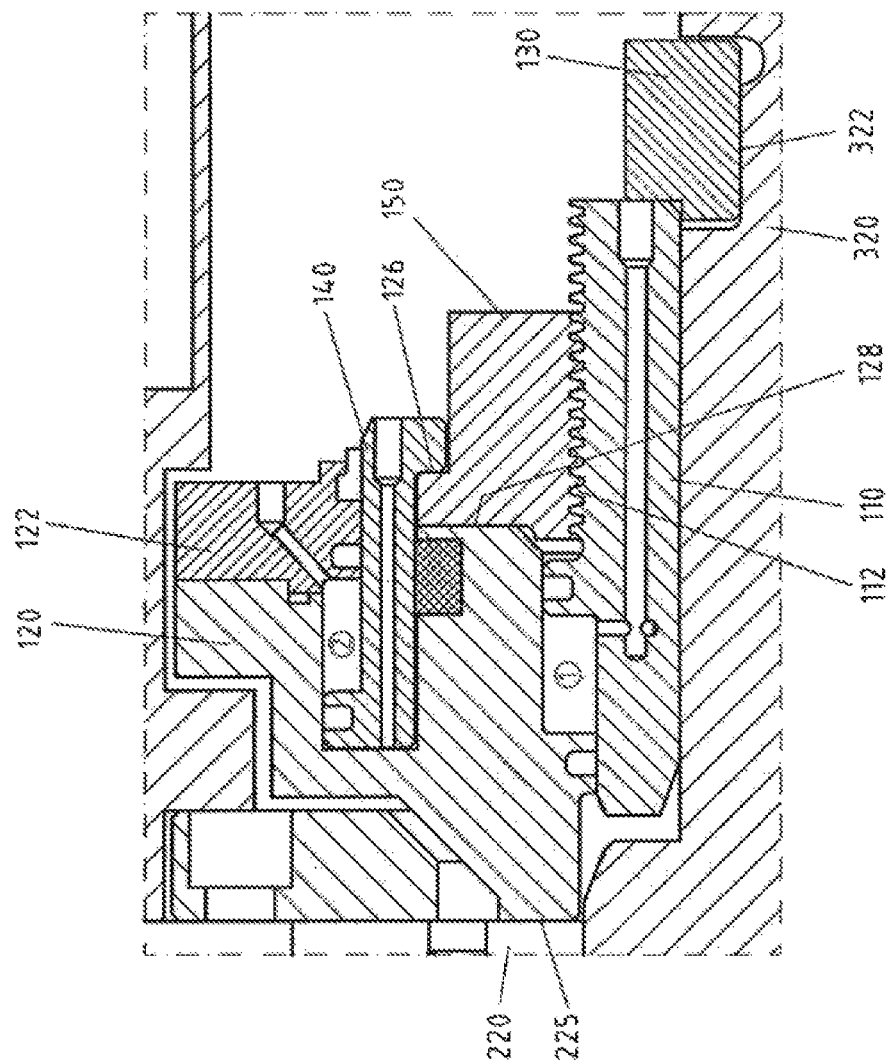

To retract the outer piston 140, channel 3-3 is opened to allow the pressure medium to drain out of chamber 3. Pressure medium is then fed in through channel 2-2 to form the removal pressure chamber 2 between cylinder cover 122 and the outer flange 142 of the outer piston. As a result, the outer piston 140 as shown in FIG. 7, with the cylinder cover 122 fixed in place, is then displaced toward the left in the direction of the roll body 330, as shown in FIG. 8. This measure serves to protect the sliding surfaces of the piston 140.

At the end of the mounting process and during rolling operation, the individual parts of the device according to the invention are arranged as shown in FIGS. 8 and 9. In this arrangement, a non-positive connection exists between the bearing 200, in particular the thrust bearing 220, and roll neck 320. This non-positive connection extends through thrust bearing 220, contact surface 225, cylinder 120, contact surface 128, nut 150, external thread 112 of the inner piston 110, inner piston 110, stop ring 130 and groove 322 in the roll neck 320. This non-positive connection prevents the bearing 200 from sliding away from roll body 330.

Figure 10:
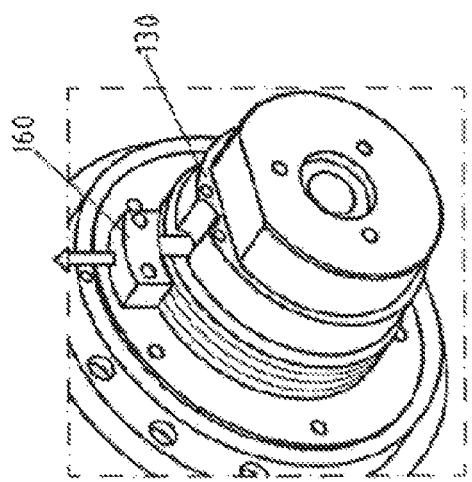
FIGS. 10-14 show sub-steps within the method according to the invention for removing the bearing from the roll neck.

The method according to the invention for removing bearing 200 from the section I of roll neck 320 close to the body using the device 100 according to the invention will be described in greater detail in the following, in which reference will be made to FIGS. 10 to 14:

At the start of the removal process, the securing element or locking piece 160 is first removed to allow nut 150 to rotate; see FIG. 10. Mounting pressure chamber 1 is then pressurized with a mounting pressure by supplying pressure medium through channel 1-1, so that cylinder 120 is pressed a minimum distance further against the bearing 200, 220 and a second contact surface 128 between cylinder 120 and nut 150 is eliminated; see FIG. 11.

Figure 11:
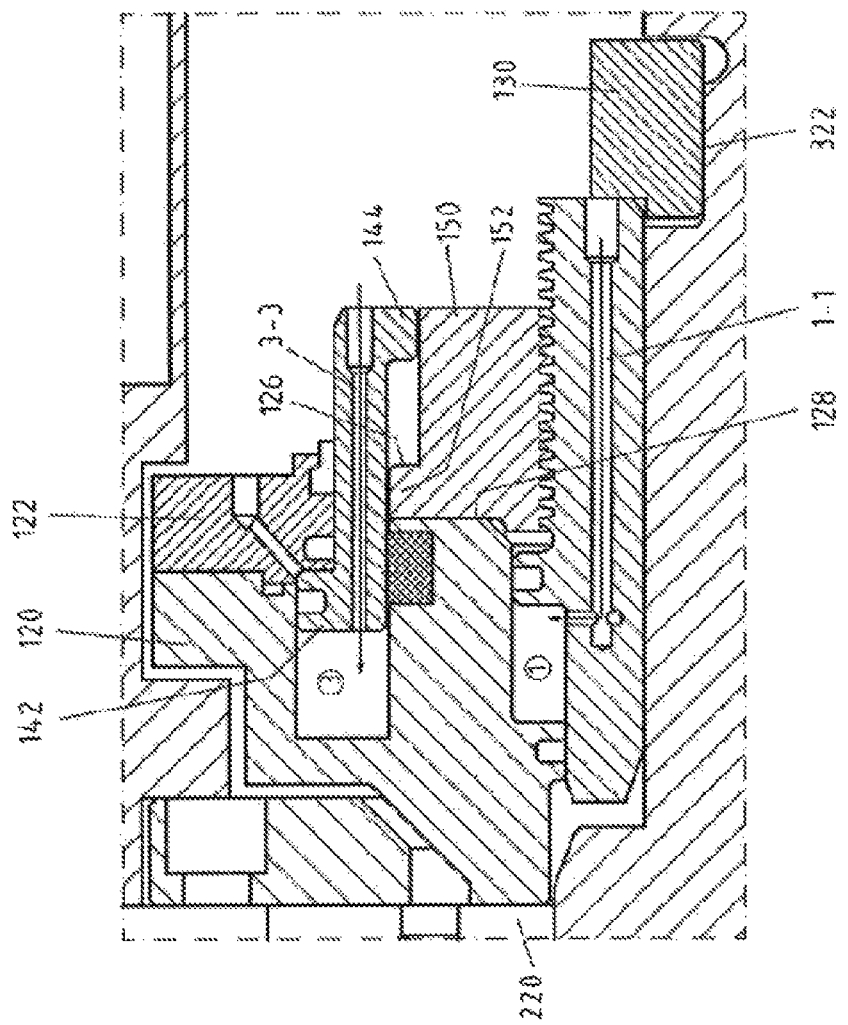

Positioning pressure chamber 3 is then pressurized with a displacement pressure by supplying the pressure medium via channel 3-3, as a result of which the outer piston 140 is moved away from the roll body and the first contact surface 126 between the nut and the outer piston is also eliminated, as shown in FIG. 11.

Outer piston 140 is preferably displaced outward, i.e. away from the roll body, until the outer flange 142 of the outer piston meets the cylinder cover 122, as shown in FIG. 11.

Figure 12:
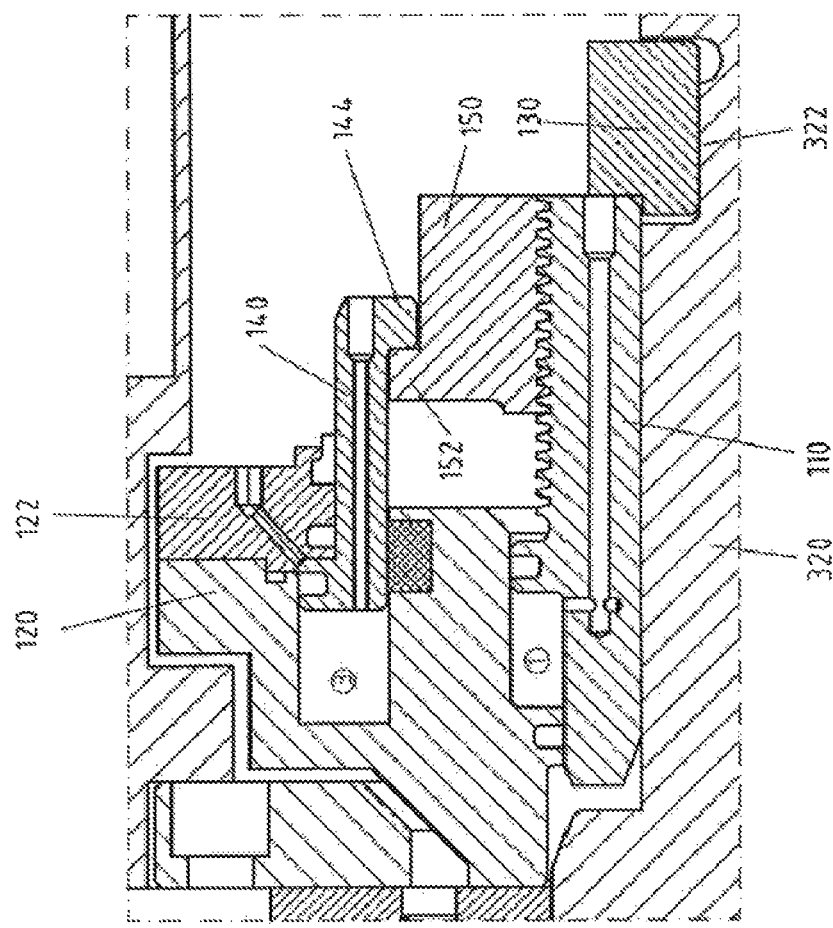

Nut 150 is then rotated axially outward, preferably until its outer flange 152 meets the inner flange 144 of the outer piston 140; see FIG. 12. The mounting pressure in mounting pressure chamber 1 can then be reduced; i.e. channel 1-1 is then opened; see FIG. 13.

Figure 13:
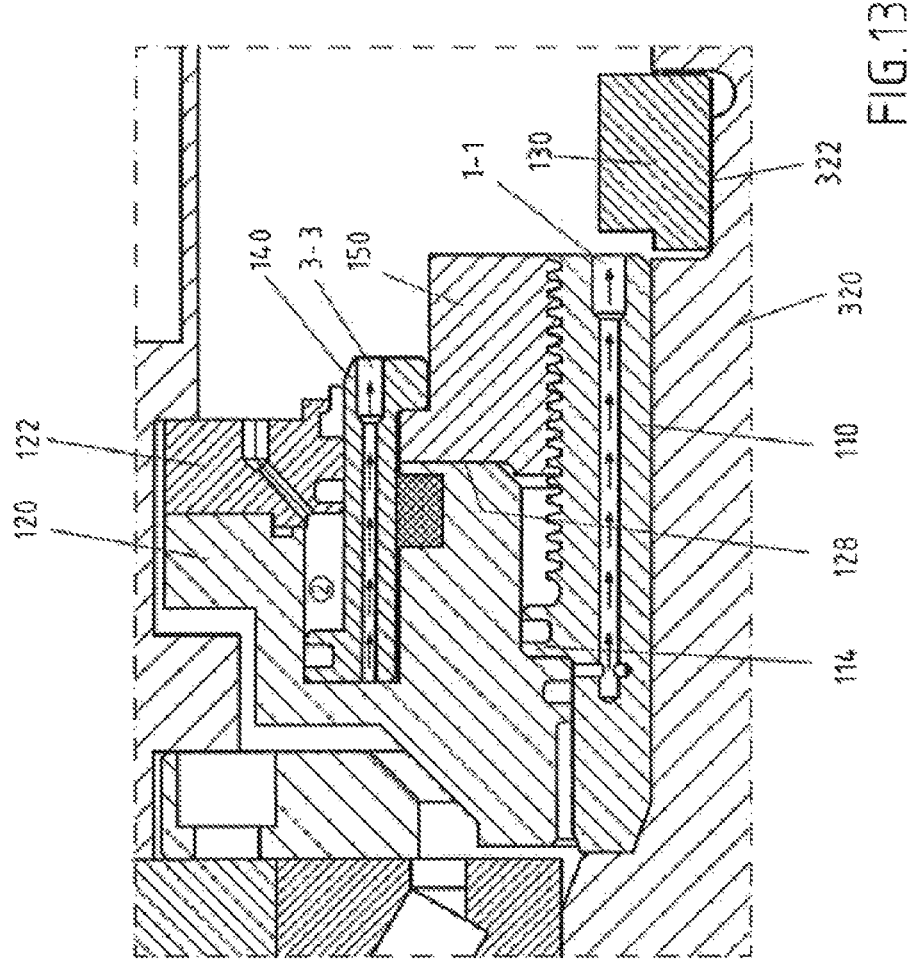

Removal pressure chamber 2 is pressurized with pressure medium through channel 2-2, and as a result, the cylinder 120 with its cover 122 is drawn outward axially, preferably until it meets the second contact surface 128 on the nut 150, as is also shown in FIG. 13. This requires that, in addition to the opening of channel 1-1, channel 3-3 is also opened, so that pressure medium can drain out of pressure chambers 1 and 3.

Because cylinder 120 is coupled to the oil film bearing 210 or the chock 400 via the coupling element 340 and the cover 350, which acts as a driver, see FIG. 2, the bearing 200 and the chock 400 are carried along when the annular cylinder 120 moves away from the roll body, and are thus pulled downward a certain distance from the roll neck 320 and loosened.

Figure 14:
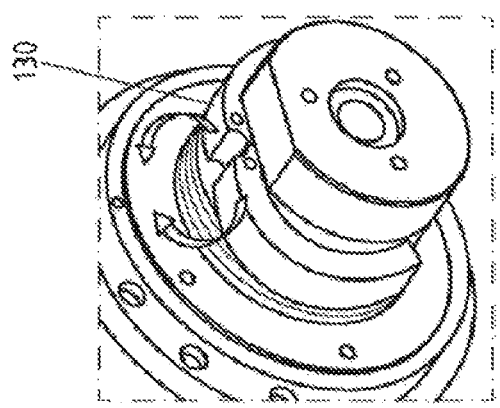

Finally, stop ring 130 is removed; see FIG. 14. The device 100 can then be removed from the roll neck 320 together with the bearing 200 and preferably also with the chock 400.

LIST OF REFERENCE SIGNS 1 mounting pressure chamber
1-1 channel for pressure medium 2 removal pressure chamber
2-2 channel for pressure medium
3 positioning pressure chamber
3-3 channel for pressure medium
100 device
110 inner piston
112 external thread
114 outer flange of the inner piston
120 cylinder
122 cylinder cover
126 first contact surface
128 second contact surface
130 stop ring
140 outer piston
142 outer flange of the outer piston
144 inner flange of the outer piston
150 nut
152 outer flange of nut
160 locking piece
200 bearing
210 oil film bearing
220 thrust bearing
225 end face of the thrust bearing facing away from the body (contact surface)
230 pressure shoulder ring
300 roll
320 roll neck
322 groove
324 neck sleeve
330 roll body
340 annular coupling element
350 annular cover
400 chock
I section close to the body
II section remote from the body
A axial direction
R radial direction

The invention claimed is:

1. A device for mounting a bearing on a first section of a roll neck of a roll, the first section being located close to a body of the roll and for removing the bearing from the first section of the roll neck that is located close to the body, said device comprising:
a first piston/cylinder unit having an annular inner piston which is mounted, axially displaceable, on a second section of the roll neck which is located remote from the body, and having an annular cylinder which is mounted, likewise axially displaceable, between the bearing and the inner piston on the second section which is located remote from the body,
wherein the annular cylinder and the inner piston overlap one another partially and are positioned such that they are displaceable relative to one another in the axial direction; and wherein a mounting pressure chamber can be formed between the annular cylinder and the inner piston;
a stop ring which is fixed in the axial direction at the end of the roll neck facing away from the body, as a stop for the inner piston;
a second piston/cylinder unit having an annular outer piston which is arranged coaxially to and radially farther outward than the inner piston and which is positioned such that it is axially displaceable, and wherein an outer flange of the outer piston delimits a removal pressure chamber of the second piston/cylinder unit at one end in the axial direction; and
a nut which can be screwed onto an external thread of the inner piston to secure the bearing in the axial direction;
wherein the annular cylinder and an annular cylinder cover which is attached to the end of said cylinder that faces away from the body together form the cylinder unit of the second piston/cylinder unit, in which the outer piston is positioned so as to be axially displaceable, and
the removal pressure chamber is delimited in the axial direction by the outer flange of the outer piston and by the cylinder cover.

2. The device according to claim 1, wherein the second piston/cylinder unit is configured as a double-acting piston/cylinder unit and, in addition to the removal pressure chamber, has a positioning pressure chamber which may be formed, and which is delimited in the axial direction by the outer piston and the annular cylinder.

3. The device according to claim 2, wherein the removal pressure chamber can be formed farther from the body than the positioning pressure chamber, as viewed in the axial direction.

4. The device according to claim 1, wherein an inner flange extending radially inward is formed at the end of the outer piston that faces away from the body;
an outer flange extends radially outward is formed at the end of the nut that faces the body;
the outer piston is positioned radially farther toward the outside than the nut, but the inner flange of the outer piston and the outer flange of the nut face one another in the axial direction; and
wherein the outer flange of the nut is positioned closer to the body than the inner flange of the outer piston.

5. The device according to claim 1, wherein the cylinder cover is formed as an integral part with the annular cylinder.

6. The device according to claim 1, wherein a groove for receiving the stop ring is provided at the end of the roll neck, wherein the stop ring is configured as a clamp ring or as a hinged ring for insertion into the groove.

7. The device according to claim 1, further comprising a securing element for securing the nut on the inner piston to prevent the nut from loosening.

8. The device according to claim 1, wherein the bearing is configured as an oil film bearing between a bearing chock and the roll neck.

9. The device according to claim 8, wherein in addition to the oil film bearing close to the body, the bearing has a thrust bearing, which is located between the oil film bearing and the cylinder in the axial direction.

10. A method for mounting a bearing on a first section of a roll neck of a roll close to a body of the roll with aid of a device, the first section being located close to the body of the roll and for removing the bearing from the first section of the roll neck that is located close to the body, said device including a first piston/cylinder unit having an annular inner piston which is mounted, axially displaceable, on a second section of the roll neck which is located remote from the body, and having an annular cylinder which is mounted, likewise axially displaceable, between the bearing and the inner piston on the second section which is located remote from the body, wherein the annular cylinder and the inner piston overlap one another partially and are positioned such that they are displaceable relative to one another in the axial direction; and wherein a mounting pressure chamber can be formed between the annular cylinder and the inner piston; a stop ring which is fixed in the axial direction at the end of the roll neck facing away from the body, as a stop for the inner piston; a second piston/cylinder unit having an annular outer piston which is arranged coaxially to and radially farther outward than the inner piston and which is positioned such that it is axially displaceable, and wherein an outer flange of the outer piston delimits a removal pressure chamber of the second piston/cylinder unit at one end in the axial direction; and a nut which can be screwed onto an external thread of the inner piston to secure the bearing in the axial direction; wherein the annular cylinder and an annular cylinder cover which is attached to the end of said cylinder that faces away from the body together form the cylinder unit of the second piston/cylinder unit, in which the outer piston is positioned so as to be axially displaceable, and the removal pressure chamber is delimited in the axial direction by the outer flange of the outer piston and by the cylinder cover, wherein the second piston/cylinder unit is configured as a double-acting piston/cylinder unit and, in addition to the removal pressure chamber, has a positioning pressure chamber which may be formed, and which is delimited in the axial direction by the outer piston and the annular cylinder, the method, comprising the steps of: prepositioning the bearing on the first section of the roll neck close to the body; prepositioning the device on the second section of the roll neck remote from the body; mounting the stop ring at the end of the roll neck as the stop, fixed in the axial direction for the inner piston; applying a mounting pressure to the mounting pressure chamber, thereby causing the inner piston to move axially outward against the stop ring and causing the cylinder to move axially inward against the bearing, and drawing the bearing onto the first section of the roll neck near the body; applying a displacement pressure to the positioning pressure chamber, thereby displacing the outer piston axially outward away from the roll body, and eliminating a first contact surface between the inner flange of the outer piston and the outer flange of the nut; rotating the nut relative to the cylinder in the direction of the roll body to secure the bearing in the axial direction; and securing the nut with the locking piece.

11. A method for removing a bearing from a section of a roll neck of a roll close to a body of the roll with the aid of the device, the first section being located close to the body of the roll and for removing the bearing from the first section of the roll neck that is located close to the body, said device including a first piston/cylinder unit having an annular inner piston which is mounted, axially displaceable, on a second section of the roll neck which is located remote from the body, and having an annular cylinder which is mounted, likewise axially displaceable, between the bearing and the inner piston on the second section which is located remote from the body, wherein the annular cylinder and the inner piston overlap one another partially and are positioned such that they are displaceable relative to one another in the axial direction; and wherein a mounting pressure chamber can be formed between the annular cylinder and the inner piston; a stop ring which is fixed in the axial direction at the end of the roll neck facing away from the body, as a stop for the inner piston; a second piston/cylinder unit having an annular outer piston which is arranged coaxially to and radially farther outward than the inner piston and which is positioned such that it is axially displaceable, and wherein an outer flange of the outer piston delimits a removal pressure chamber of the second piston/cylinder unit at one end in the axial direction; and a nut which can be screwed onto an external thread of the inner piston to secure the bearing in the axial direction; wherein the annular cylinder and an annular cylinder cover which is attached to the end of said cylinder that faces away from the body together form the cylinder unit of the second piston/cylinder unit, in which the outer piston is positioned so as to be axially displaceable, and the removal pressure chamber is delimited in the axial direction by the outer flange of the outer piston and by the cylinder cover, wherein the second piston/cylinder unit is configured as a double-acting piston/cylinder unit and, in addition to the removal pressure chamber, has a positioning pressure chamber which may be formed, and which is delimited in the axial direction by the outer piston and the annular cylinder, the method, comprising the steps of: removing a securing element for securing the nut on the inner piston; applying a mounting pressure to the mounting pressure chamber, so that the cylinder is pressed with greater force against the bearing and a second contact surface between the cylinder and the nut is eliminated; applying a displacement pressure to the positioning pressure chamber to displace the outer piston away from the roll body; rotating the nut axially outward back away from the cylinder; reducing the mounting pressure in the mounting pressure chamber; applying a removal pressure to the removal pressure chamber, thereby drawing the cylinder outward axially against the nut; and removing the stop ring; and removing the device and the bearing attached to the device from the roll neck.

12. The method of claim 11, wherein the step of rotating the nut includes rotating the nut until the outer flange of the nut meets an inner flange of the outer piston.

* * * * *